(12) United States Patent
Nielsen

(10) Patent No.: US 11,279,115 B2
(45) Date of Patent: Mar. 22, 2022

(54) FLOOR COVERING

(71) Applicant: Olivier Nielsen, Ibos (FR)

(72) Inventor: Olivier Nielsen, Ibos (FR)

(73) Assignee: ADHETEC, Tarbes (FR)

( * ) Notice: Subject to any disclaimer, the term of this patent is extended or adjusted under 35 U.S.C. 154(b) by 27 days.

(21) Appl. No.: 17/016,920

(22) Filed: Sep. 10, 2020

(65) Prior Publication Data

US 2021/0070021 A1    Mar. 11, 2021

(30) Foreign Application Priority Data

Sep. 11, 2019 (FR) ...................................... 1909984

(51) Int. Cl.
| | | |
|---|---|---|
| *B32B 3/10* | (2006.01) | |
| *B32B 25/08* | (2006.01) | |
| *B32B 5/02* | (2006.01) | |
| *B32B 25/10* | (2006.01) | |
| *B32B 27/36* | (2006.01) | |
| *B32B 38/00* | (2006.01) | |

(52) U.S. Cl.
CPC .............. *B32B 25/08* (2013.01); *B32B 5/022* (2013.01); *B32B 5/024* (2013.01); *B32B 25/10* (2013.01); *B32B 27/36* (2013.01); *B32B 38/00* (2013.01); *B32B 2038/0076* (2013.01); *B32B 2255/02* (2013.01); *B32B 2255/10* (2013.01); *B32B 2255/26* (2013.01); *B32B 2307/3065* (2013.01); *B32B 2307/4023* (2013.01); *B32B 2307/41* (2013.01); *B32B 2307/412* (2013.01); *B32B 2471/00* (2013.01); *B32B 2605/003* (2013.01)

(58) Field of Classification Search
None
See application file for complete search history.

(56) References Cited

U.S. PATENT DOCUMENTS

| | | | | |
|---|---|---|---|---|
| 6,093,473 A | * | 7/2000 | Min ........................ | B32B 37/00 428/147 |
| 2016/0297132 A1 | | 10/2016 | Rischer et al. | |
| 2017/0073979 A1 | * | 3/2017 | Clement ................. | B32B 37/12 |

FOREIGN PATENT DOCUMENTS

FR           3 010 428 A1      3/2015

OTHER PUBLICATIONS

Rapport De Recherche Preliminaire dated May 12, 2020, for French Application No. 1909984, filed Sep. 11, 2019, 2019, 6 pages.

* cited by examiner

*Primary Examiner* — Christopher M Polley
(74) *Attorney, Agent, or Firm* — Christensen O'Connor Johnson Kindness PLLC

(57) ABSTRACT

A disclosed method for manufacturing a floor covering includes the steps of vulcanising a support layer made of an elastomer and assembling an intermediate layer to the support layer during the step of vulcanising, wherein the intermediate layer is made of a material selected from the group that includes polyester, polyetheretherketone, polyetherimide, polysulfone, polyimide, polyamide, fluoropolymer, polyurethane, and paper. A print layer is printed either the intermediate layer or a transparent protective layer. When the print layer is printed on the intermediate layer, the protective layer is assembled to the print layer of a set that includes the print layer, the intermediate layer, and the support layer. When the print layer is printed on the protective layer, the print layer of a set that includes the print layer and the protective layer is assembled to the intermediate layer of a set that includes the intermediate layer and the support layer.

7 Claims, 3 Drawing Sheets

[Fig. 1]
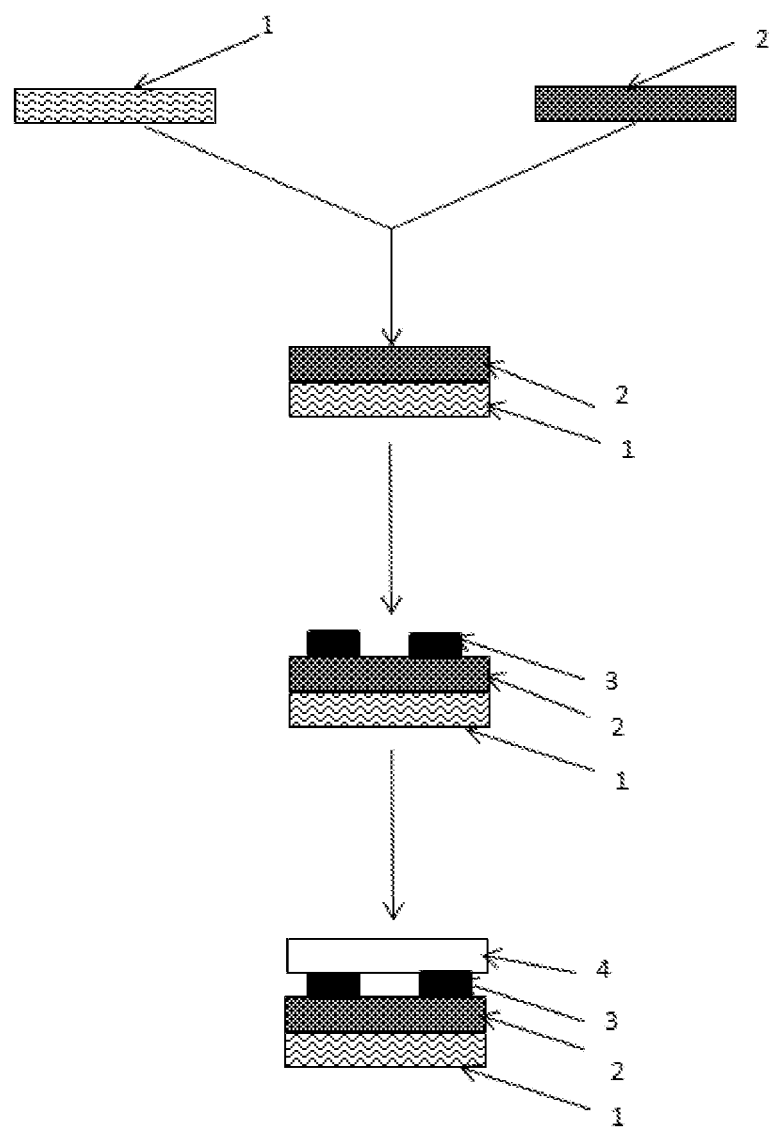

[Fig. 2]
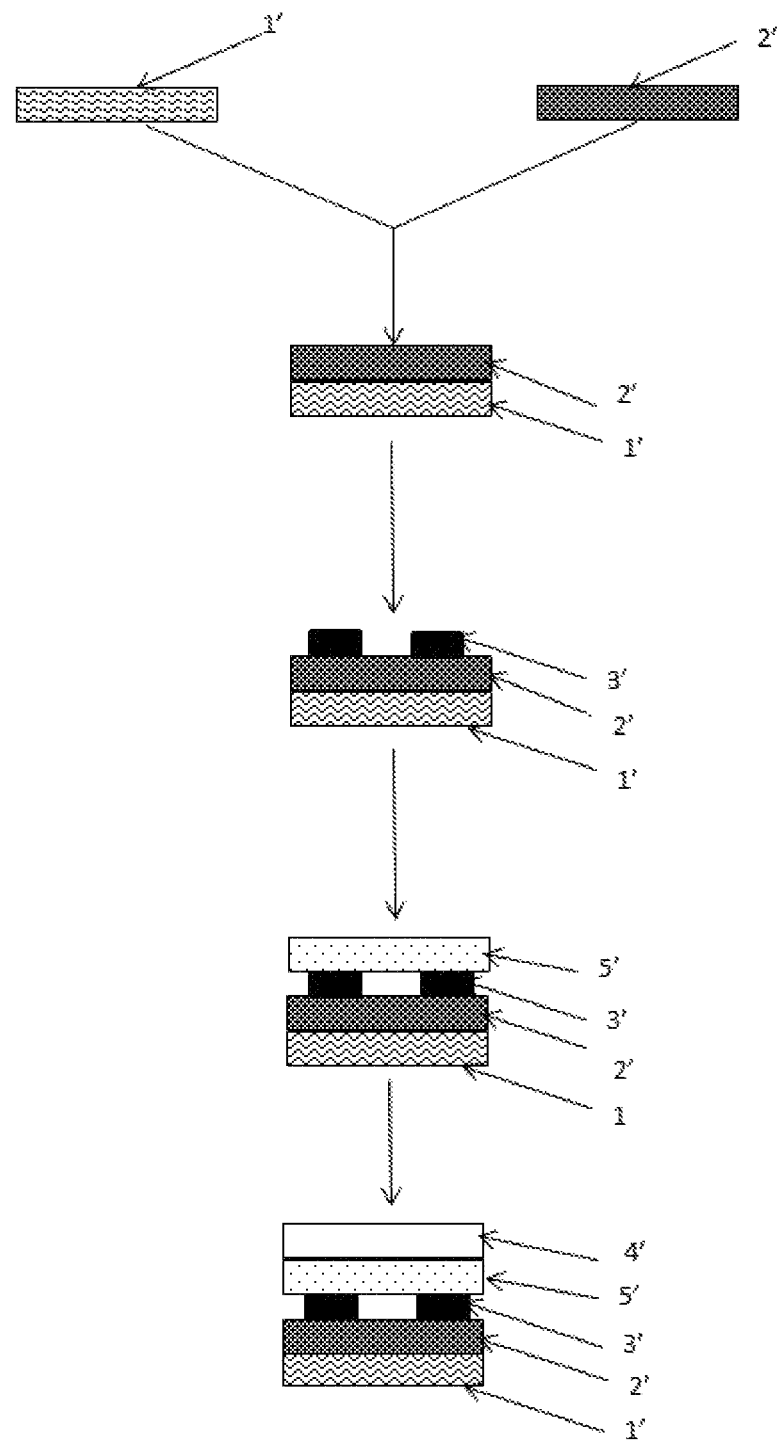

[Fig. 3]
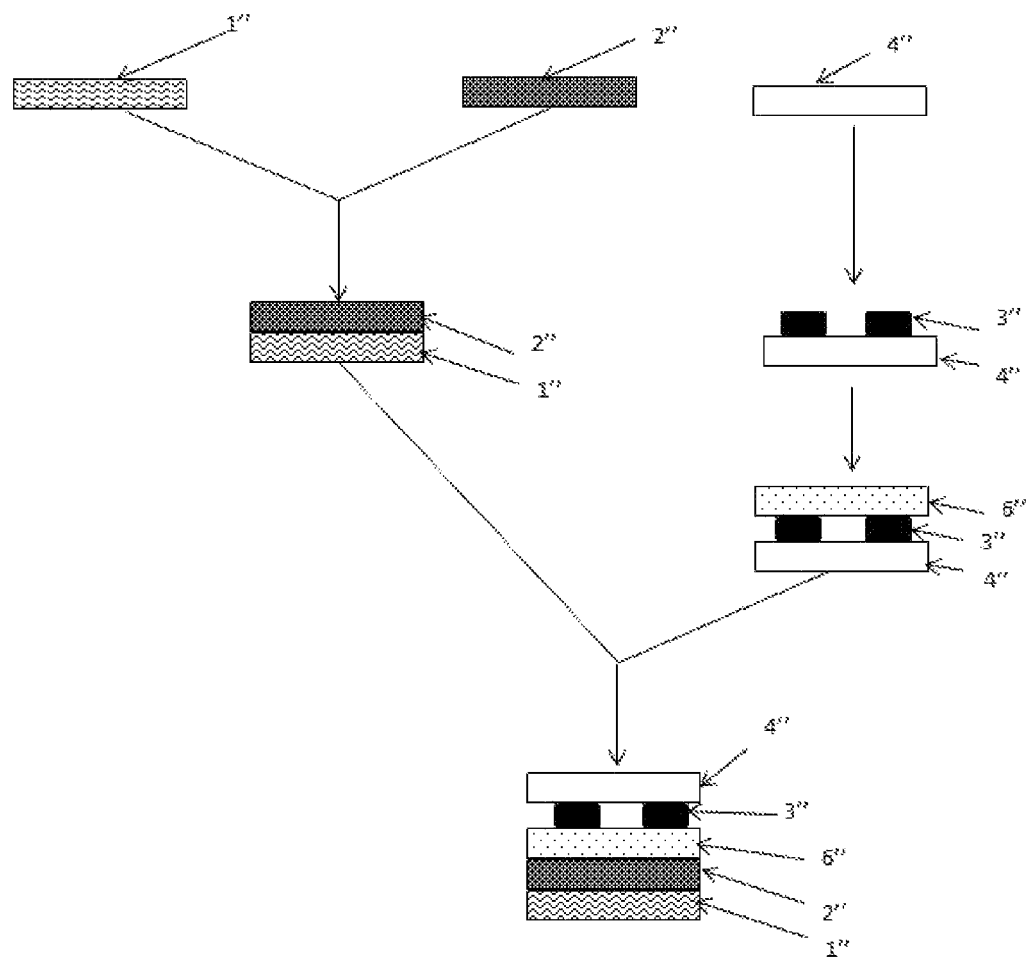

FLOOR COVERING

CROSS REFERENCE TO RELATED APPLICATION

This application claims priority under 35 U.S.C. § 119 to French Patent Application No. 1909984, filed Sep. 11, 2019, which is incorporated by reference herein in its entirety.

TECHNICAL FIELD

The present disclosure relates to a method for manufacturing a floor covering and the floor covering obtained by this method.

BACKGROUND

The synthetic floor coverings are generally multi-layer coverings. They usually consist of a support layer, usually consisting of a web of fibres embedded in plastic material such as polyvinyl chloride (PVC) and covered with a print layer showing a pattern or decoration. The decorative layer is protected from wear by a transparent plastic protective layer.

This type of floor covering is cost effective but has many disadvantages. It is indeed highly flammable and therefore cannot be laid in places with strict fire protection standards such as aircraft or railway vehicles.

In addition, it has poor impact absorption. It is therefore preferable to add a resilient under layer, such as foam, to the support layer to improve the comfort of this covering. However, the resilient layer and the support layer tend to disassemble over time.

The patterns or decoration of the print layer are often limited.

Finally, most synthetic floor coverings emit organic compounds, in particular because of the solvents and adhesives they contain.

There is therefore a need for new synthetic floor coverings which, while remaining cost effective, have better wear, impact and fire resistance qualities.

SUMMARY

For this purpose, the disclosed subject matter relates to a method for manufacturing a floor covering comprising the steps of:

(a) vulcanising a layer, called support layer, made of elastomer, (b) assembling a layer, called intermediate layer, to the support layer during the step of vulcanising, the intermediate layer being made of a material selected from the group consisting of polyester, polyetheretherketone, polyetherimide, polysulfone, polyimide, polyamide, fluoropolymer, polyurethane and paper, (c) printing a layer, called print layer, on the intermediate layer or on a layer, called protective layer, which is transparent, (d1) in the case where the print layer has been printed on the intermediate layer, assembling the transparent protective layer to the print layer of the set comprising the print layer, the intermediate layer and the support layer, or (d2) in the case where the print layer has been printed on the transparent protective layer, assembling the print layer of the set comprising the print layer and the protective layer to the intermediate layer of the set comprising the intermediate layer and the support layer.

The elastomer support layer provides the floor covering with impact resistance and walking comfort. In addition, the assembling of the support layer to the intermediate layer during the step of vulcanising provides better adhesion between these two materials. Indeed, the elastomer of the support layer during vulcanisation penetrates the asperities of the intermediate layer where it cross-links.

In the description which follows, the terms top, bottom, upper, lower and the like are used to define an orderly relationship between the different layers constituting the floor covering according to the disclosed subject matter and/or their respective faces, by reference to an axis normal to the surface on which the floor covering is to be applied and oriented from the surface on which the floor covering is to be applied towards the outside of the floor covering.

Prior to the vulcanisation of the support layer, the latter can be formed by mixing an elastomer with a vulcanising agent. The resulting vulcanisable elastomer composition is stretched to form a film, for example by calendering.

Advantageously, the step of vulcanising is carried out at a temperature between 150° C. and 200° C., preferably between 155° C. and 165° C., and at a pressure between 100 bars and 185 bars.

The assembling of the intermediate layer and the support layer is carried out by bringing these two layers into contact during the step of vulcanising and by exerting pressure on these two layers.

The printing of the print layer can be digital printing, e.g. an ink jet printing or screen printing. Preferably, the printing is inkjet printing. This means that the printed pattern can be easily personalised.

According to a first variant of the disclosed subject matter, the method according to the disclosed subject matter comprises the steps of:

(c1) printing the print layer on the intermediate layer, (d1) assembling the protective layer to the print layer.

The intermediate layer is made of a material selected from the group consisting of polyester, polyetheretherketone, polyetherimide, polysulfone, polyimide, polyamide, fluoropolymer, polyurethane and paper. Preferably, the intermediate layer is made of polyester.

In this variant, the protective layer can be applied directly to the print layer or the protective layer can be assembled to the print layer by means of a layer of adhesive. Preferably, a fluid or pasty protective composition is applied to the print layer and cured to form the protective layer. Preferably, the protective composition can be a UV-cross-linkable resin. The resin is poured or sprayed onto the print layer and then cured with UV light. In this way, the constraints associated with the use of solvents are eliminated. In addition, when a UV ink is used to form the print layer, it is possible to increase the adhesion between the print layer and the protective layer by:

cross-linking the UV print layer incompletely, depositing a UV cross-linkable protective resin, and cross-linking the protective resin with UV light to form the protective layer.

Thus, the dangling bonds of the ink of the print layer that have not been cross-linked because the UV cross-linking of the print layer has been shortened will be able to react with the dangling UV resin bonds of the protective layer when the latter cross-links.

Alternatively, the protective layer can be produced by depositing a two-component resin, e.g. polyisocyanate and polyol or polyisocyanate-amine. These resins can be cross-linked, as this cross-linking can be catalysed by heat.

A resin in solvent phase with a hardener can also be used to form the protective layer.

According to a second variant of the disclosed subject matter, the method according to the disclosed subject matter comprises the steps of:

(c2) printing the print layer on the protective layer, (d2) assembling the print layer of the set comprising the print layer and the protective layer to the intermediate layer of the set comprising the intermediate layer and the support layer.

In this variant, the protective layer is preferably provided in the form of a film, e.g. polyurethane or acrylic film.

The assembling of the print layer to the intermediate layer can be done by means of an adhesive layer.

The disclosed subject matter also relates to a floor covering characterised in that it comprises at least:
- a layer, called protective layer, which is transparent,
- a layer, called print layer, consisting of an ink layer,
- a layer, called intermediate layer, made of a material selected from the group consisting of polyester, polyetheretherketone, polyetherimide, polysulfone, polyimide, polyamide, fluoropolymer, polyurethane and paper,
- a layer, called support layer, made of elastomer,
- the intermediate layer and the support layer being assembled together.

According to a preferred embodiment, the intermediate layer and the support layer are assembled together during the vulcanisation of the support layer.

Typically, the intermediate layer and the support layer form a set, called basal set. The print layer is located between the intermediate layer of the basal set and the protective layer. The print layer consists of an ink layer printed on the intermediate layer or on the protective layer.

Thus, according to a first variant of the disclosed subject matter, the print layer consists of an ink layer printed on the intermediate layer. According to this variant, the print layer can be covered directly by the layer of the protection. The print layer is then sandwiched between the intermediate layer and the protective layer. The print layer can also be covered by the layer of the protection by means of an adhesive layer. However, in order to limit the emission of volatile organic compounds, floor coverings without an adhesive layer are preferable.

According to a second variant of the disclosed subject matter, the print layer consists of an ink layer printed on the protective layer. The set consisting of the protective layer and the print layer can be bonded to the basal set consisting of the intermediate layer and the support layer by means of a layer of adhesive. The layer of adhesive is then sandwiched between the intermediate layer and the print layer.

Advantageously, the print layer can consist of an ink layer deposited by a digital printer such as an inkjet printer or by screen printing. The ink can be with or without solvent. Preferably a solvent-free ink such as UV ink is used.

As for the protective layer, it can be polyurethane or acrylic. It is preferably made of a UV resin such as a UV resin based on polyester acrylate, acrylate, polyester acrylate or urethane acrylate. Advantageously, the protective layer comprises a flame retardant.

The intermediate layer can be in film, woven or non-woven form.

The intermediate layer is made of a material selected from the group consisting of polyester, polyetheretherketone, polyetherimide, polysulfone, polyimide, polyamide, fluoropolymer, polyurethane and paper.

Preferably, the intermediate layer is made of polyester. The polyester of the intermediate layer can for example be a semi-aromatic copolyester such as polyethylene terephthalate (PET), polybutylene terephthalate (PBT), polytrimethylene terephthalate (PTT) or polyethylene naphthalate (PEN). Preferably, the polyester of the intermediate layer is PET.

Advantageously, the intermediate layer is opaque. Defects in the support layer are thus masked by the intermediate layer.

The elastomer of the support layer can be selected from the group consisting of acrylonitrile butadiene rubber, hydrogenated acrylonitrile butadiene, carboxidized nitrile, ethylene-propylene-diene rubber, polysiloxane-vinylmethyl silicone, fluorinated rubber, perfluorinated rubber, chloroprene, polyacrylate and ethylene-acrylate. Preferably, the elastomer of the support layer is butadiene-acrylonitrile rubber. Advantageously, the elastomer comprises a flame retardant, preferably a halogenated flame retardant.

The floor covering may comprise an adhesive on its lower face, more precisely on the lower face of the support layer, and in order to be able to glue the covering according to the disclosed subject matter to the floor. This adhesive can be coated or deposited in the form of a film. It can be protected with a protective sheet so that the floor covering can be handled without the handler coming into contact with the adhesive.

The floor covering according to the disclosed subject matter may be in the form of a roll.

The floor covering according to the disclosed subject matter can be used, in particular, in the railway or aeronautical field.

DESCRIPTION OF THE DRAWINGS

The foregoing aspects and many of the attendant advantages of this disclosed subject matter will become more readily appreciated as the same become better understood by reference to the following detailed description, when taken in conjunction with the accompanying drawings, wherein:

FIG. 1 represents schematic cross-sections of different layers or sets of layers illustrating the successive steps of a first embodiment of the method for manufacturing a floor covering according to the present disclosure;

FIG. 2 shows schematic cross-sections of different layers or sets of layers illustrating the successive steps of a second embodiment of the method for manufacturing a floor covering according to the present disclosure; and FIG. 3 represents schematic cross-sections of different layers or sets of layers illustrating the successive steps of a third embodiment of the method for manufacturing a floor covering according to the present disclosure.

In the figures, scales and proportions are not strictly respected to for purposes of illustration and clarity.

DETAILED DESCRIPTION

FIG. 1 represents a first embodiment of the method for manufacturing a floor covering according to the disclosed subject matter.

A support layer 1 intended to be vulcanised is provided. The support layer 1 is typically an elastomer film with a thickness of 0.5 mm to 3 mm.

In order to manufacture this elastomer film, a mixture of elastomer and vulcanising agent has been formulated and calendered to obtain a film of the required thickness.

A polyester intermediate layer 2 is also supplied. The intermediate layer 2 is generally opaque and is typically 23 μm to 300 μm thick. This intermediate layer 2 can be in film, fabric or non-woven form, depending on the required roughness. The surface tension of intermediate layer 2 can also be increased by subjecting this layer to a corona or plasma surface treatment beforehand.

The support layer 1 and intermediate layer 2 are superimposed. The upper face of the support layer 1 is brought into contact with the lower face of the intermediate layer 2. The whole is subjected to a temperature of 150° C. to 200° C. and a pressure of 100 to 185 bars. This operation can be carried out in a rotocure type device. The support layer 1 is thus vulcanised. During vulcanisation, the elastomer of the support layer 1, which is in contact with the intermediate layer 2, penetrates into the asperities of the latter and cross-links there, thus creating a very strong bond between the support layer 1 and the intermediate layer 2.

The ink is printed on the upper face of the intermediate layer to form a print layer 3. The printing is carried out by an inkjet printer with UV ink. The ink is UV-cured.

The print layer 3 is then covered with a protective layer 4. The protective layer can be applied to the print layer by coating, e.g. roll to roll coating, spraying, e.g. spraying from a spray gun or pouring and spreading.

FIG. 2 shows a second embodiment of the method for manufacturing a floor covering according to the disclosed subject matter.

The steps of vulcanising the support layer 1', assembling the intermediate layer 2' and printing the print layer 3' are identical to those of the first embodiment.

In this second embodiment, following the printing step, the upper face of the print layer 3' is covered with an adhesive layer 5'. The protective layer 4' is then glued onto the print layer 3' using this adhesive layer 5'.

FIG. 3 shows a third embodiment of the method for manufacturing a floor covering according to the disclosed subject matter.

The steps of vulcanising the support layer 1" and assembling the intermediate layer 2" are identical to those of the first and second embodiments.

The method for manufacturing a floor covering according to this third embodiment comprises a step of providing a protective layer 4". The print layer 3" is printed on one face of the protective layer 4", e.g. using an ink jet printer. A layer of adhesive 6" is applied to the print layer 3". The print layer 3" is then sandwiched between the protective layer and the layer of adhesive 6". The set comprising the layer of adhesive 6", the print layer 3" and the protective layer 4" are assembled to the upper face of the intermediate layer 2" of the set comprising the intermediate layer 2" and the support layer 1" forming the floor covering.

LIST OF REFERENCE SIGNS

1, 1', 1": support layer
2, 2', 2": intermediate layer
3, 3', 3": print layer
4, 4', 4": protective layer
5': adhesive layer
6": layer of adhesive While illustrative embodiments have been illustrated and described, it will be appreciated that various changes can be made therein without departing from the spirit and scope of the disclosed subject matter.

The invention claimed is:

1. A floor covering, comprising:
   a protective layer that is transparent;
   a print layer comprising of an ink layer;
   an intermediate layer made of a material selected from the group consisting of polyester, polyetheretherketone, polyetherimide, polysulfone, polyimide, polyamide, fluoropolymer, and polyurethane;
   a print layer comprising of an ink layer printed on the intermediate layer; and
   a support layer made of an elastomer,
   wherein the intermediate layer and the support layer are bonded to each other by crosslinks.

2. The floor covering according to claim 1, wherein the intermediate layer is made of polyester.

3. The floor covering according to claim 1, wherein the intermediate layer and the support layer are assembled during vulcanisation of the elastomer of the support layer.

4. The floor covering according to claim 1, wherein the print layer comprises an ink layer printed on the intermediate layer.

5. The floor covering according to claim 4, wherein the print layer is disposed between the intermediate layer and the protective layer.

6. The floor covering according to claim 1, wherein the print layer comprises an ink layer printed on the protective layer.

7. The floor covering according to claim 1, wherein the intermediate layer is one of woven, non-woven, and in film form.

* * * * *